Patented Jan. 3, 1939

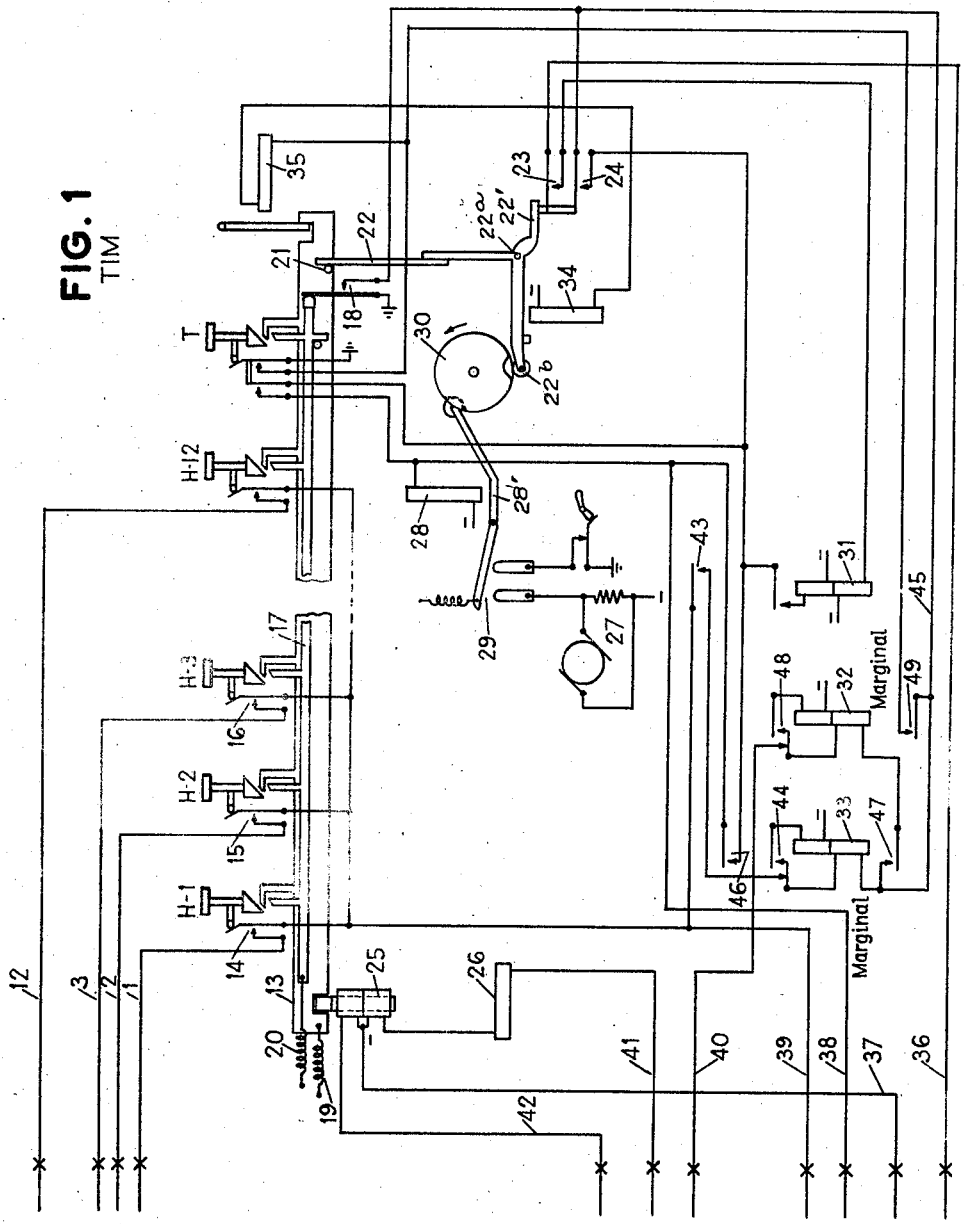

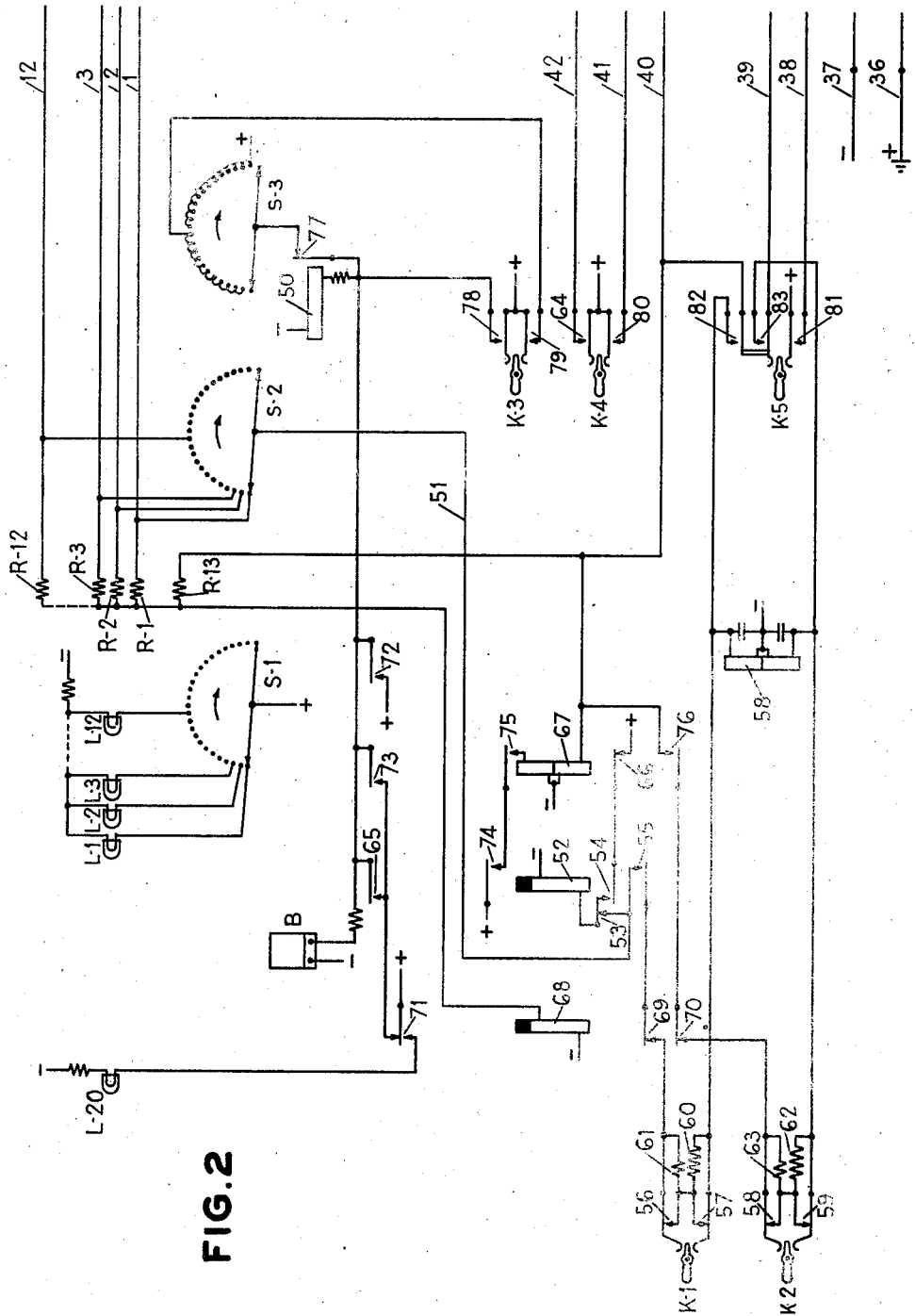

2,142,655

UNITED STATES PATENT OFFICE 2,142,655

TEST EQUIPMENT

Harold C. Robinson, Providence, R. I., assignor to Associated Electric Laboratories, Inc., Chicago, Ill., a corporation of Delaware Application May 14, 1936, Serial No. 79,734

3 Claims. (Cl. 235—92)

My invention relates in general to a test equipment and more specifically to a test equipment for testing the functions of a ticket-issuing machine such as used in totalizing systems.

The ticket-issuing machines used with such systems are well known and usually comprise a series of keys, one for each competitor, a motor, and printing mechanism for printing and issuing a ticket, together with certain relays for controlling the sequence of operations of the machine.

The ticket machine here illustrated and tested is the type used at race courses for issuing tickets of a certain value on any one of a number of competitors. In such systems a totalizer is provided for each competitor to totalize all tickets issued by the machine on that competitor and a grand totalizer is provided for totaling all tickets issued by all machines. The competitor and grand totalizers are connected to the machines in such a manner that impulses are sent back and forth between them and the machine to insure proper registration of each ticket issued before the machine can be again operated.

The object of this invention is, therefore, to provide a testing equipment which may be connected to any ticket-issuing machine of a system and which may then be controlled to test all of the functions of that machine one after another and indicate any faults either in the operation of the machine or in its sending of signals to the totalizers. Further features will be explained in the following detailed description by reference to the accompanying drawings.

Fig. 1 shows a schematic diagram of the essential parts of a ticket-issuing machine.

Fig. 2 shows my improved test equipment which is shown connected to the machine of Fig. 1 for testing that machine.

The ticket machine shown diagrammatically in Fig. 1 is of a well known type in general use at race courses and this figure is a copy of Fig. 3 in my copending application Ser. No. 734,940 filed July 13, 1934. In said prior application this machine is shown connected to the totalizers and its operation with the totalizers is fully explained. In the present disclosure the leads from the machine are shown connected to the test equipment instead of to the totalizers. In practice, in commercial installations the machines are jack connected to the totalizers by means of the various leads shown at the left of Fig. 1, and when it is desired to test a machine its leads are disconnected from the totalizers and connected to the test equipment. In the present disclosure I have shown all leads connected to the test equipment and have indicated by X at the left of Fig. 1 a set of contacts in each lead which represent the plug and jack contacts or key contacts which connect the machine and test equipment. Throughout the drawings I have shown + and − connections to the various relays and it should be understood that a source of current is used which is common and which has its positive terminal connected to ground.

I will first describe generally the functions of the machine of Fig. 1 and how it normally cooperates with its associated totalizers. The machine comprises a series of competitor keys H—I to H—I2, inclusive, only 4 of which are shown, and a test key T. Each of the keys, when operated, locks under a projection on a locking bar 13, closes a pair of springs such as 14, 15, or 16, and also moves the bars 17 to the right to operate the off-normal springs 18. The bars 13 and 17 are normally held by springs 19 and 20 in their left-hand position as shown. In addition, whenever a key is pressed, and bar 13 is moved to the right, the pin 21 presses the spring 22 to the right and thereby moves arm 22' to close contacts 23 and 24. The arm 22' is pivoted at the point 22a and has a roller 22b normally opposite an indentation in the roller 30 so that when the roller is in the position shown, springs 22 may move the arm 22' to operate the springs 23 and 24. Also, springs 22 will flex to allow restoration of the arm 22' when the roller 30 is moved off-normal. The roller 30 always returns to the position shown after each cycle of operation. The magnet 25 is a locking magnet which must be operated to unlock the bar 13 before a key may be operated. The magnet 26 is for changing the printing set-up in the machine from one race to the next and its function is not here illustrated or explained in further detail. At 27 is indicated the motor which operates the machine to issue and print a ticket when the circuit of magnet 28 is closed to close the knife switch 29 by means of its armature 28'. The motor also rotates the cam 30 in the direction indicated to maintain the switch 29 closed for a complete revolution and to open springs 23 and 24.

Whenever a key is pressed with cam 30 in normal position the closure of springs 23 completes a circuit for the lower winding of relay 31 through springs 23 and over a conductor 38 to ground at the totalizing equipment (not shown). Relay 31 energizes and locks through its own contacts and through springs 24 and 18 to ground. Relay 31 closes springs 43 to complete the circuit of relay 33 through a pair of key springs such as 14 (assuming key H—1 operated) to the totalizer for the #1 competitor. In the normal operation when this signal to the totalizer is registered therein a signal is sent back over lead 1 through springs 14 and 43 to increase the current in this circuit to operate relay 33. Relay 33 is marginal and only operates in this circuit when the increased current is sent back. Relay 33 operates and locks by means of springs 44 over a circuit including its two windings in series and over conductor 45 to ground through springs 18. The energization of relay 33 now completes a circuit to the magnet 28 through springs 46, springs 24, and springs 18 to close the motor circuit and start the machine to issue a ticket. At the same time relay 33 completes a circuit to the grand totalizer over conductor 40 through relay 32, springs 47, conductor 45, and springs 18 to ground. Relay 32 is also marginal and does not operate until the signal has been registered in the totalizer and a signal of increased current is sent back. When this occurs relay 32 energizes and locks through its springs 48, opens conductor 40, and closes springs 49. The closure of springs 49 completes a circuit from ground through springs 18, conductor 45, springs 49, and release magnets 35 and 34 in series. Magnet 35 pulls the bar 13 to the right to unlock the operated key and magnet 34 opens springs 23 and 24, if not already opened by cam 30. As soon as the operated key releases, arm 17 is released and moves to the left to thereby open springs 18, and relays 31, 32, and 33 restore to normal.

As stated, the test equipment of Fig. 2 is designed to test the machine to see that all these functions occur at the right times in the machine, and the test equipment practically takes the place of the individual and grand totalizers to receive signals from the machine and transmit signals thereto and check the accuracy thereof and also to control the functions by means of keys.

In Fig. 2 I have shown at S—1, S—2, and S—3 the wipers of a rotary stepping switch of any well known design such as commonly used in automatic telephony, which steps its wipers only when the magnet has been energized and then deenergized. These three wipers are stepped around together by a motor magnet 50. The wiper S' has twelve lamps connected to its first twelve bank contacts and ground or positive potential connected to its wiper so that it always indicates by a lighted lamp which of the leads 1—12 the wiper S—2 is connected with.

*Operation*

After the test equipment of Fig. 2 has been connected with a machine, as shown, and that machine has been disconnected from its totalizers lamp L—1 is lighted with the wiper S—1 in the position shown and conductor 51 is connected through wiper S—2 (in first position) with conductor #1 of key H—1. The operator now presses the key K—4 to close springs 64 to energize magnet 25 of the machine under test to permit operation of its keys. The operator also operates keys K—1 and K—2 to open springs 57 and 59 to include the high resistances 60 and 62 in circuit. The operator now presses the key H—1 of the machine to test the functions thereof. A circuit is now completed from negative battery through relay 52 (Fig. 2) springs 53, conductor 51, wiper S—2, and its 1st contact, conductor 1, springs 14 (closed by key H—1), springs 43, lower winding of relay 33, and through spring 18 to ground. When the key was operated, and springs 18, 23, and 24 closed, the relay 31 was operated over conductor 36 and springs 23 to close springs 43 in the circuit of relay 33. Relay 52 is of high resistance and does not permit operation of relay 33. Relay 52, however, operates in this circuit to open springs 53 and close springs 54, 55, 65, and 74. Springs 54 complete a locking circuit for relay 52 through springs 66 of relay 67 and springs 55 transfer the circuit of relay 33 to a circuit including springs 56 and resistance 60 through upper winding of relay 58 to negative battery. This resistance 60 is just above the operating limit of relay 33 and that relay should not operate therewith. Connected to each contact in the bank of wiper S—2 is a resistance R—1, R—2, etc., each of 2000 ohms and all connected at the opposite end through relay 68 to negative battery. The relay 68 is so wound and adjusted that it will not operate in series with any 2000 ohm resistance. If, however, any two of the leads 1, 2, 3, etc., should be shorted together either in the cable or in the keys H—1, H—2, etc., then this relay 68 would be connected through two or more of these 2000 ohm resistances in parallel to ground and would operate. The operation of relay 68 opens springs 69 and 70 and closes springs 71. The opening of springs 69 and 70 prevents any control of the ticket machine and springs 71 light lamp L—20 to indicate a short circuit and removes ground from the buzzer and operating magnet circuit.

The closure of springs 65 by relays 52 closes a circuit, assuming that relay 68 does not operate, for the motor magnet 50 of the switch S and that magnet energizes to prepare for moving the wipers to their next position when it is deenergized. Relay 58 energized in the above-traced circuit with relay 33 to close springs 72 to close another circuit for magnet 50. A branch circuit is also closed by springs 65 and 72 for the buzzer B to start the operation of the buzzer. No further operations should occur until the operator presses key K—1 in the other direction to open springs 56 and close springs 57. This lowers the resistance of the circuit back to the machine over conductors 51 and 1 and should cause the relay 33 (Fig. 1) to operate. Relay 33 as previously explained should now close springs 46 to start the motor of the machine to issue a ticket and should also close springs 47 to connect the lower winding of relay 32 in series with grand total lead 40 and relay 67 at the test equipment. Relay 33 also opens the circuit over leads 1 and 51 at the normal springs of springs 44 and locks energized. Relay 67 energizes in series with relay 32 but relay 32 does not energize. Relay 67 closes another circuit at springs 73 for rotary switch magnet 50 and opens the locking circuit of relay 52 at springs 66. Relay 52, being slow to release, as indicated, remains up for a short interval and maintains a holding circuit at springs 74 for relay 67 which is completed by springs 75 of that relay. Again there is a resistance R—13 of 2000 ohms in series with relay 68 branched off from the circuit including relays 67 and 32 and should lead 40 be shorted with any of the leads 1, 2, 3, etc., then again relay 68 would energize. Assuming no operation of relay 68, then relay 67, at contacts 76, completes a circuit for relay 32 at the machine over conductor 40, springs 76, springs 70, springs 58, high resistance 62, and relay 58 to negative battery. Relay 32 should not operate in the circuit with resistance 62, but relays 58 and 67 remain operated. The operator may now margin the relay 32 by including the low resistance 63 in its circuit instead of resistance 62 through key K—2. Relay 32 should now operate to open conductor 40, lock itself energized through springs 48 and both windings, and close springs 49 to operate the release magnets 34 and 35 to release the operated key H—1. When conductor 40 is opened by relay 32, the circuit of relays 57 and 58 is opened. Relays 57 and 58 now open their springs 73 and 72 and remove all ground connections from the circuit of magnet 50 (relay 52 having previously restored and opened springs 65). The magnet 50 now deenergizes and steps the wipers S—1, S—2, and S—3 to their second contacts to light the lamp L—2 at wiper S—1 and prepare a circuit over conductor 2 to the springs of key H—2 at the ticket machine. The operator may now operate key H—2 of the ticket machine and the circuit of relays 52 and 58 is now closed again through relay 33 and the test equipment is carried through the same sequence of tests by operating first key K—1 to margin relay 33 and then operating key K—2 to margin relay 32. Each time also the relay 68 tests for shorts between the various leads. After all keys H—1 to H—12 have been operated and successively tested the switch wipers S—1, S—2, and S—3 are moved to their thirteenth contacts, in which position a self-interrupting circuit is closed for magnet 50 through its springs 77, and it will operate intermittently to step the wipers on around to their normal position as shown. The circuit of magnet 50 is open in this position.

A key K—3 is provided which may be operated to one position to close springs 78 to step the wipers one step at a time to any desired position to test a particular key. This key may also be operated to its other position to close springs 79 to release the wipers from any of its first twelve positions to normal. The springs 79 close a circuit which is common to all the contacts in the first twelve positions of wiper S—3 and thus complete the self-interrupting circuit of magnet 50 through springs 77. The key K—4 as stated is operated to close springs 64 to unlock the keys of the ticket machine and may also be operated to close springs 80 which complete a circuit for both magnets 25 and 26. The magnet 25 unlocks the keys H—1, etc., while magnet 26 resets the type of the machine to print the number of the next race on the next tickets printed. The key K—5 may be operated to close springs 81 which merely close a circuit for magnet 28 of the ticket machine to cause it to issue a single ticket. This key K—5 if operated to close springs 82 and 83 is operated when the tester may have operated the wrong key of the ticket machine instead of the one to which wiper S—2 is connected. In this case the ticket machine relay 33 could not be operated by key K—1. The operation of springs 82 and 83 by key K—5 connects negative battery through both sides of relay 58 to leads 39 and 40. This completes the circuit of relay 33 and then of relay 32, after 33 has operated, to release the operated ticket-issuing machine key and restore it to normal. The leads 36 and 37 merely connect negative and positive battery to the corresponding leads of the ticket machine which would be left open when the machine is disconnected from its totalizers.

Thus it will be seen that the test equipment of Fig. 2 replaces the totalizer equipment and controls all of the functions of the ticket machine which are normally controlled from the totalizer equipment. The relay 68 tests for crosses or short circuits in the wires and cabling and when such is encountered, lights a lamp L—20 and opens the buzzer circuit. Key K—1 is used to margin the relay 33 of the machine and send thereto the increased current usually sent by the totalizer to operate the relay and connect up the relay 32 to the grand total lead 40. The relay 67 then responds to connect up the key K—2 for margining relay 32 and send the increased current thereto usually received from the grand totalizer. If the tests are successful the buzzer is then cut off and the wipers of the sequence switch automatically advanced to the next lead.

Having fully described the features and operation of my improved testing equipment, what I consider to be new and desire to have protected by Letters Patent will be pointed out in the appended claims.

What is claimed is:

1. In a totalizing system wherein an adding device and a ticket issuing machine are connected by a series of conductors, and wherein the ticket issuing machine has a series of keys for sending signals to the adding device over said conductors to be totalized and responds to signals from the adding device to issue tickets, the provision of a testing equipment for testing the functions of a machine adapted to be connected to the conductors thereof in the place of an adding device, said equipment having control keys and relays, and a sequence switch controlled responsive to the operation of one of the control keys to connect certain of said relays successively to certain of said conductors, said certain relays responsive to a signal over a conductor connected thereto by said switch to control the transmission of other signals from the machine, others of said relays responsive to said other signals over certain of the conductors to step the switch to the next conductor and to operate a signal indicating a fault when such signals are not received.

2. In a totalizing system, a ticket machine having a plurality of leads extending therefrom and means for sending and receiving signals thereover, a ticket machine testing equipment adapted to be connected to the machine through said leads, said equipment comprising a rotary switch having access to certain of said leads and a series of control keys and control relays, said switch operated responsive to the operation of certain of said keys to connect certain of said relays to one of said certain leads, said certain relay responsive to a signal over said one lead to return a signal thereover to the machine, others of said relays in the equipment responsive to another signal over certain of the leads from the machine to operate the rotary switch to connect said certain relays to another of said certain leads from the machine, said relays preventing further movement of the switch in case of failure to receive said other signal.

3. In a totalizing system, a ticket machine having a plurality of leads extending therefrom, and a series of keys therein for controlling certain of said leads, a testing equipment adapted to be connected to the machine through the leads thereof, said equipment comprising a sequence switch having access to said certain leads and a series of control keys and control relays, means responsive to the operation of certain of said control keys for rendering said machine operative and other means responsive to the operation of certain of said control keys for controlling the operation of said switch to connect certain of said relays to one of said certain leads, means responsive to the operation of a key in the machine for sending a signal over said one lead to control said certain relays to associate certain other of said control keys with said one lead, a signal returned over said one lead responsive to operation of certain of said other keys associated therewith, effective to cause the machine to send another signal over certain other of said leads to control certain of said relays to associate another of said control keys with said other lead, a signal returned over said other lead responsive to operation of said last control key associated therewith effective to cause the sequence switch to connect said certain relays to another of said certain leads.

HAROLD C. ROBINSON.